United States Patent [19]
Leblanc et al.

[11] 4,363,474
[45] Dec. 14, 1982

[54] ANTI-PULL-OUT BUMPER

[75] Inventors: Raymond F. Leblanc, North Canton; William T. Cummins, Mogadore, both of Ohio

[73] Assignee: Teledyne Industries, Inc., Calif.

[21] Appl. No.: 258,610

[22] Filed: Apr. 29, 1981

[51] Int. Cl.³ .......................... F16M 7/00; E02B 3/22
[52] U.S. Cl. .................................... 267/140; 114/219; 293/136; 405/213
[58] Field of Search ................ 114/219; 267/140, 153, 267/70, 71; 293/136; 188/382; 405/211, 212, 213, 214, 215

[56] References Cited
U.S. PATENT DOCUMENTS
3,715,139  2/1973  Tuggle ................................ 267/140
4,109,474  8/1978  Files et al. ........................... 405/213

Primary Examiner—Duane A. Reger
Attorney, Agent, or Firm—Frease & Bishop

[57] ABSTRACT

An energy-absorbing shock cell for mounting bumper or barrier devices on legs or other members of offshore oil rig structures having inner and outer metal tubes connected by an intervening rubber sleevelike body is provided with snubbing means engageable between limit members rigidly mounted in spaced relation on the inner and outer tubes to prevent telescopic outward movement of said inner tube from the outer tube beyond a certain predetermined location, thereby preventing the inner tube from being pulled completely out of the outer tube by external forces which would destroy the shock cell.

4 Claims, 3 Drawing Figures

ANTI-PULL-OUT BUMPER

BACKGROUND OF THE INVENTION

1. Field of the Invention

The invention relates to energy-absorbing shock cells for mounting bumpers, barriers, or like devices or angularly extending or slanting legs of fixed offshore oil rig structures, such as platforms, barge loading docks, or similar structures.

More particularly the invention relates to shock cells having anti-pull-out components which prevent the shock cells from being pulled or torn apart or destroyed. Such pull-out shock cell failure can occur when a ship becomes trapped, tied or otherwise engaged to or with bumpers or barriers mounted by such shock cells on a fixed oil rig structure, and when such ship moves relative to the rig structure, for example by wave action. Such shock cell failure can require complete rebuilding of the bumper or barrier and replacement of the damaged shock cell or cells.

2. Description of the Prior Art

Prior shock cells are known wherein inward telescoping of the cell inner cylinder is stopped or cushioned by a stop member, which may shatter, in the cell outer cylinder when a bumper or barrier on an oil rig is rammed by or acts to fend off a boat or barge striking the bumper or barrier with great force, as in U.S. Pat. No. 4,109,474. However, such prior devices do not protect the rig structure from pull-out shock cell failure damage.

When a ship is tied to a dock bumper, wave action or wind may react against the ship to move the ship away from the dock. Sometimes such pull-away forces become strong enough that the shock cell at top or bottom of a bumper will pull the inner shock cell cylinder completely out of a shock cell mounting.

A similar failure can occur when a ship accidentally pulls away from a rig structure while still tied to a rig barrier mounted by shock cells on the rig structure.

Accordingly, there has been a long-felt want and there is an existing need for an anti-pull-out shock cell structure for mounting bumpers or barriers on fixed offshore oil rigs which will avoid the extensive damage to and the costly repairs required for oil rigs which previously have resulted when a shock cell pull-out incident has occurred.

SUMMARY OF THE INVENTION

Objectives of the invention include providing a new shock cell construction having components preventing pull-out destruction of the shock cell when subjected to severe pulling forces by movement of a ship relative to the oil rig structure on which bumpers or barriers are mounted by the new shock cells; providing such shock cell construction in which axial movement in either direction between the inner and outer telescoped pipe members, of the shock cell joined by a rubber sleevelike body, is limited to a predetermined degree and also cushioned when the shock cell is subjected to externally applied forces resulting in such axial movement; and providing a new shock cell construction which achieves the stated objectives, which is reliable, efficient and effective in preventing shock cell pull-out, and which shock cell solves problems and satisfies needs that long have existed with respect to offshore oil rig structure bumper and barrier devices.

These and other objectives and advantages may be obtained by the new shock cell construction the general nature of which is set forth below and may be stated as an anti-pull-out mechanism for a shock cell having inner and outer metal pipe members each of which has inner and outer ends joined by a rubber sleevelike body between the outer end of the outer pipe member and the inner end of the inner pipe member; including first rigid metal limit means mounted in fixed position within the inner end of said outer pipe member, second rigid metal limit means mounted in fixed position within the inner end of said inner pipe member, there being aligned openings formed in said first and second limit means, a flexible metal snub member extending through said aligned openings having inner and free ends and having an enlarged head at its inner end engaged with the first limit means and having an enlarged head at its free end located within the inner pipe member, said snub member having a length between enlarged heads greater than the normal space between said first and second limit means to define a predetermined snub distance, and stop means associated with the enlarged head at the snub member free end engageable with the second limit means when the inner pipe member moves telescopically out of said outer pipe member said predetermined snub distance to prevent further movement of said inner pipe member out of said outer pipe member.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

Similar numerals refer to similar parts throughout the various figures of the drawings.

DESCRIPTION OF THE PREFERRED EMBODIMENT

Figure 1:
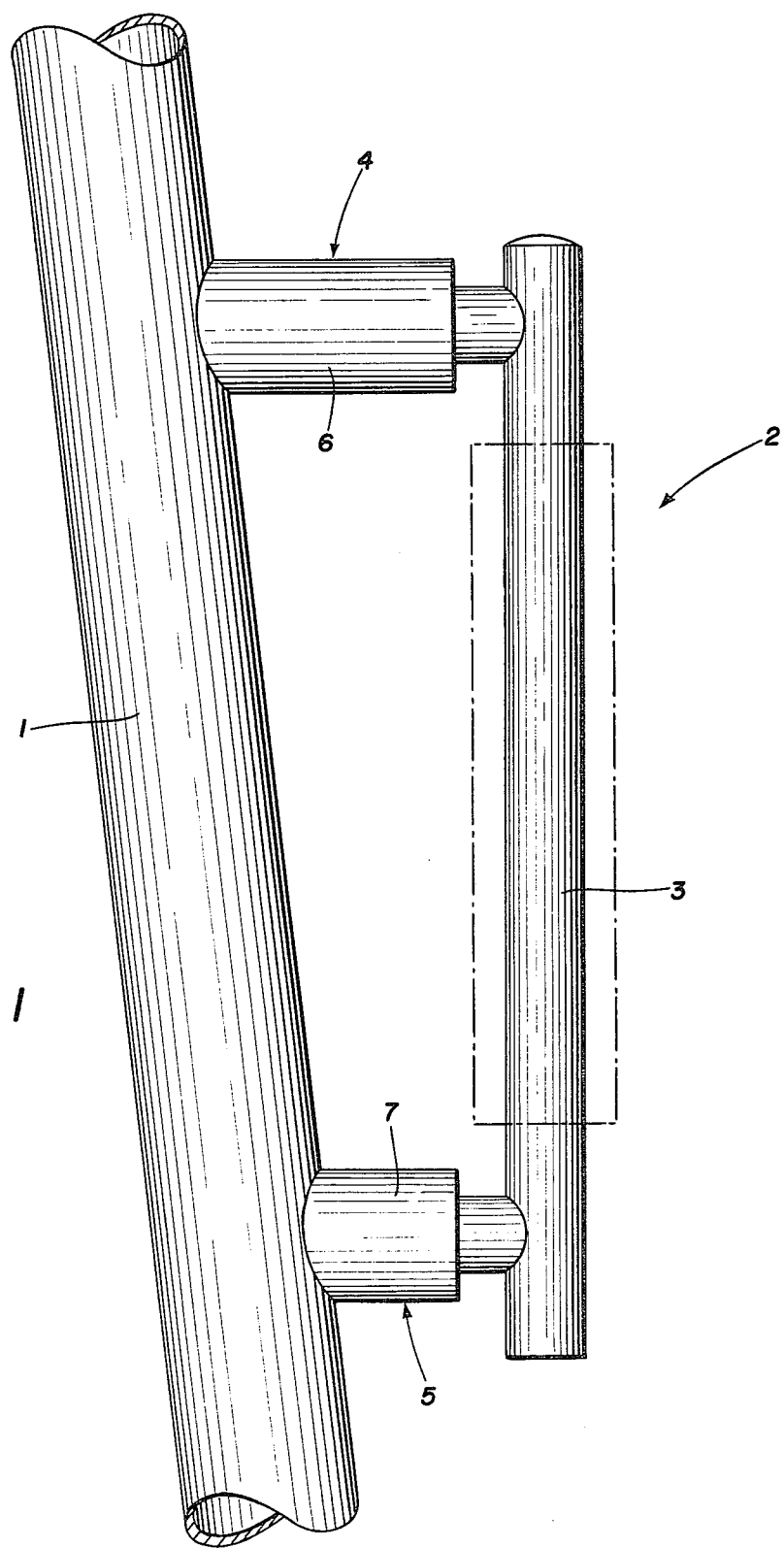
FIG. 1 is a somewhat diagrammatic view of a typical oil rig bumper mounted on a leg of a platform structure with upper and lower shock cells of the improved construction.

The mounting of a bumper on the leg 1 of a typical oil rig structure is generally indicated at 2 in FIG. 1. The bumper may have a vertical member 3 supported by upper shock cell 4 and lower shock cell 5 on the leg 1. The shock cells 4 and 5 are similar in construction excepting that the shock cell 4 has a longer outer pipe member 6 than the pipe member 7 of the lower shock cell 5 to accommodate the angular position of the leg 1.

The shock cells 4 and 5 may have a typical construction of telescoped inner and outer pipe members joined by a sleevelike rubber body; or the shock cells may have the improved construction set forth in our copending application Ser. No. 257,881, filed Apr. 27, 1981, entitled Method of Making Shock Cells and Shock Cell Product.

Figure 2:
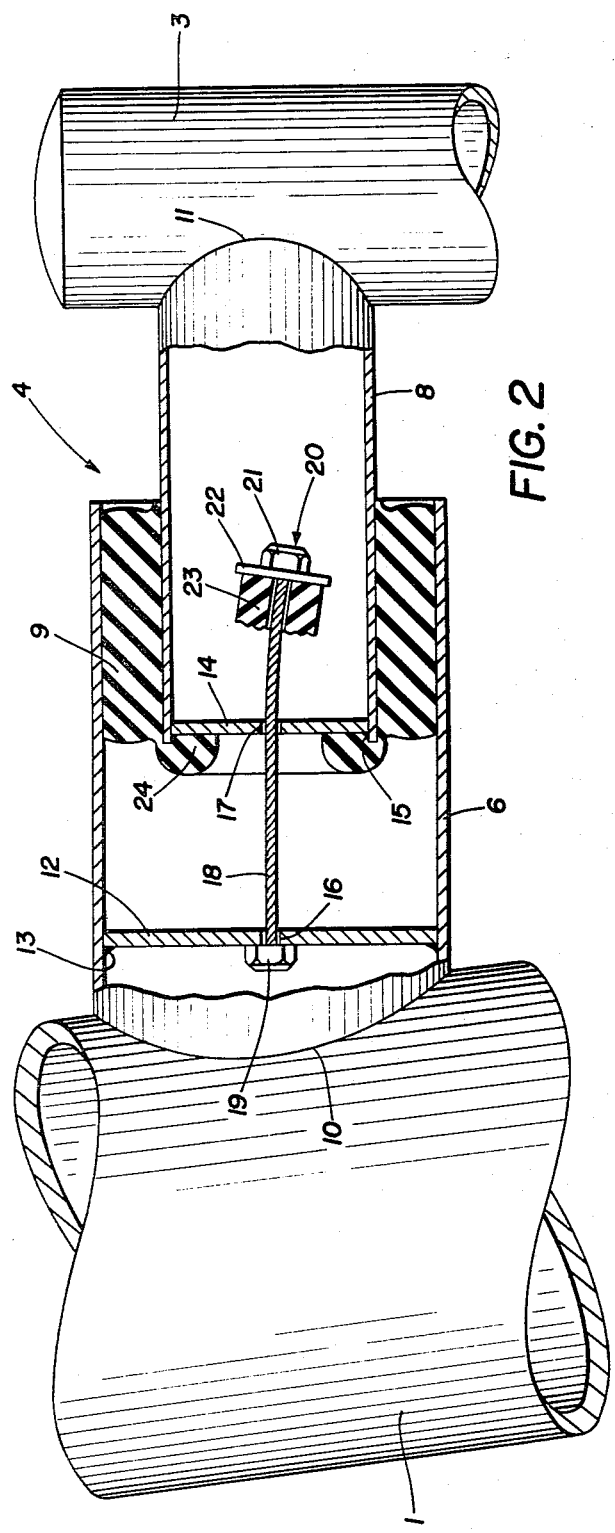
FIG. 2 is an enlarged sectional view, somewhat diagrammatic, of a fragmentary portion of one of the shock cells shown in FIG. 1, illustrating the anti-pull-out components thereof in the normal position of the shock cell at rest when not subjected to external forces tending to pull or tear the inner pipe member of the shock cell completely out of the outer shock cell pipe member mounted on the leg of a fixed oil rig structure.
Figure 3:
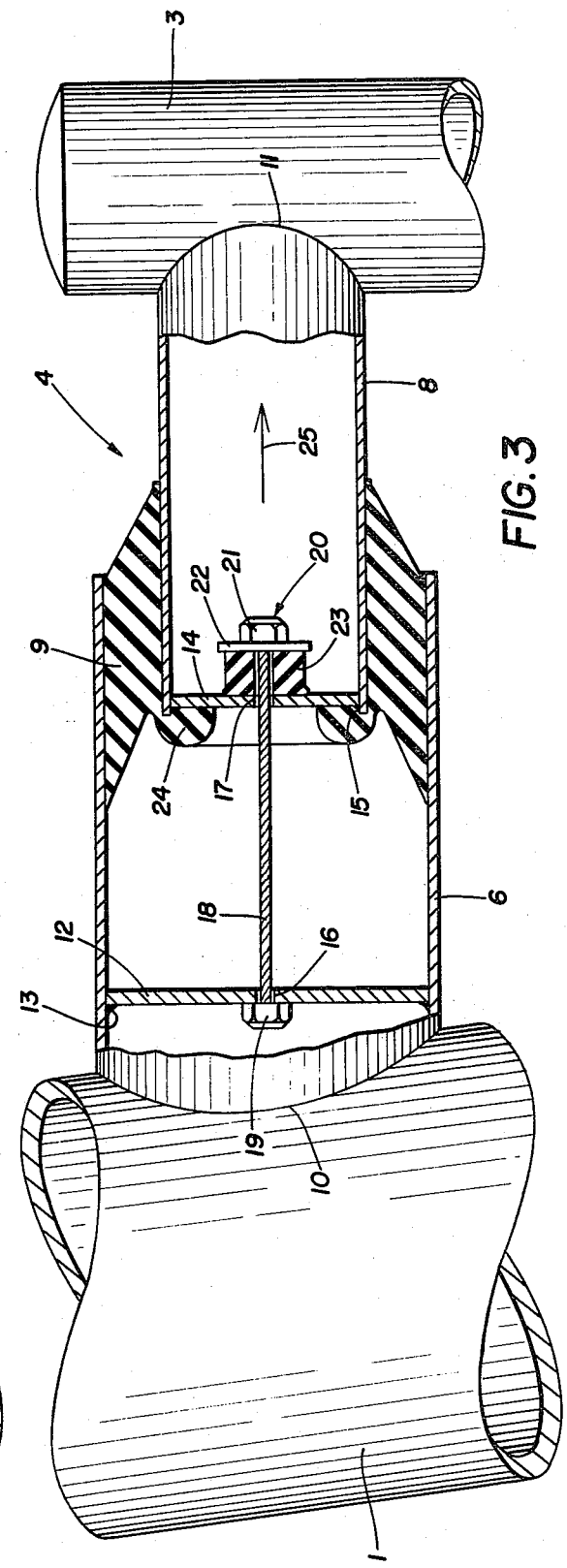
FIG. 3 is a view similar to FIG. 2 showing the shock cell parts in FIG. 2 in the position of limited pull-out movement resulting from an external force applied to the shock cell tending to destructively pull the inner pipe member out of the shock cell.

In accordance with the invention, the shock cells 4 or 5 of whatever type selected, are modified with the addition of anti-pull-out components illustrated in FIGS. 2 and 3 where the upper shock cell 4 is shown. The shock cell 4 has an outer pipe member 6, an inner pipe member 8 and a rubber sleeve 9 bonded to the outer and inner pipe members 6 and 8. The inner end of the outer pipe member 6 may be connected in any usual manner with the rig leg 1, such as by welding at 10. The outer end of the inner pipe member 8 also may be connected in the usual manner to the bumper vertical member 3, such as by welding at 11.

A structural metal limit member 12 which may be a heavy plate, channel or heavy flat striplike bar is mounted within the inner end portion of the outer pipe member 6 of the shock cell 4 in a strong, rigid fixed position and condition as by welding at 13. Similarly, a heavy structural limit member 14 which also may be a plate, channel or flat striplike metal bar also is rigidly mounted in fixed position within the inner end portion of the inner pipe member 8 as by welding at 15.

The metal structural members 12 and 14 are provided, respectively, with preferably centrally located openings 16 and 17. A preferably flexible snub member 18 has an inner end extending through the structural member opening 16 and is formed with an enlarged head 19. The head 19 may be provided by welding a nut to the inner end of the member 18. The other end portion of the flexible member 18 extends through the opening 17 in the structural member 14 to a free end generally indicated at 20 where it may be formed with an enlarged head 21 engaged with a metal disc, plate or other washerlike member 22. The enlarged head 21 also may be formed by welding a nut to the free end 20 of member 18, as shown.

The portion of the free end 20 of the flexible snub member 18 is surrounded by a large doughnutlike rubber cushion member 23 which may be bonded to the disk 22. Similarly a ring or doughnutlike rubber cushion member 24 is bonded to the inner end of the inner pipe member 8 and to the structural limit member 14.

The flexible snub member 18 is a high-strength metal cable, wire rope or chain having a length from head 19 to head 21 such that when the member 18 is extended as shown in FIG. 2, the distance between the limit member 14 and the cushion member 23 is equal to the distance that the shock cell inner pipe member 8 may, with a safety factor, be moved or pulled axially out of the outer pipe member 6 without failure of the shock cell by tearing loose from the rubber body 9 which joins the inner and outer pipe members 8 and 6, or by tearing the rubber body 9 loose from the outer pipe member 6, or by shear tearing the rubber body 9 apart within the body.

This distance or slack in the flexible snub member 18 between the member 14 and cushion 23 when the shock cell is at rest is a measure of the predetermined degree of relative movement which may occur in axially withdrawing the inner shock cell pipe member 8 from the outer shock cell pipe member 6 without failure of the shock cell 4.

FIG. 3 illustrates the position of the parts when such predetermined degree of movement of the inner pipe member 8 has occurred as a result of an externally applied pulling force, indicated by the arrow 25, imparted to the shock cell in some manner from ship movement transmitted to the bumper member 3.

Such predetermined degree of movement if exceeded substantially or beyond the design safety factor, in the absence of the flexible snub member 18 in past installations would have resulted in pull-out failure of the shock cell.

When the position of the parts shown in FIG. 3 is reached by the externally applied pull force 25, the cushion 23 engages the limit member 14 and is compressed thereby cushioning the reactive resistance of the flexible snub member 18 in bringing further pull-out movement of the pipe member 8 to rest.

The enlarged head 21 on the free end 20 of the flexible snub member 18 and the disk 22 are designed so that if the safety factor for the predetermined degree of movement is exceeded and continues to be exceeded, for example, and a ship accidentally tied to the bumper continues to move away from the oil rig structure the enlarged head 21 or the disk 22 will fail so that the shock cell will fail by pull-out to prevent continued ship movement away from the rig structure from dislodging or pulling the rig structure over. The latter condition, of course, would involve more damage than finally permitting the shock cell pull-out failure to occur.

It is clear that the improved shock cell anti-pull-out construction permits normal functioning of the shock cell to absorb energy when forces are applied to the inner shock cell pipe member 8 to drive it telescopically inward of the outer pipe member 6. Inward energy-absorbing movement of the inner pipe member 8 ultimately is stopped by engagement of the cushion 24 with the structural limit member 12 which cushions the impact of stopping further inner pipe member inward movement. The limit member 12 is designed such that it can withstand such cushion stoppage without fracture or other injury to the member 12 which otherwise would destroy its ability to function as a part of the anti-pull-out mechanism.

Accordingly the new shock cell anti-pull-out construction provides an anti-pull-out bumper which satisfies the stated objectives and solves a problem and satisfies a need that has long existed in the art.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new shock cell is constructed and operates, and the advantageous, new and useful results obtained; the new and useful structures, devices, components, elements, arrangements, parts, and combinations are set forth in the appended claims.

We claim:

1. An anti-pull-out mechanism for a shock cell having inner and outer metal pipe members each of which has inner and outer ends joined by a rubber sleevelike body between the outer end of the outer pipe member and the inner end of the inner pipe member; including first rigid metal limit means mounted in fixed position within the inner end of said outer pipe member, second rigid metal limit means mounted in fixed position within the inner end of said inner pipe member, there being aligned openings formed in said first and second limit means, a flexible metal snub member extending through said aligned openings having inner and free ends and having an enlarged head at its inner end engaged with the first limit means and having an enlarged head at its free end located within the inner pipe member, said snub member having a length between enlarged heads greater than the normal space between said first and second limit means to define a predetermined snub distance, and stop means associated with the enlarged head at the snub member free end engageable with the second limit means when the inner pipe member moves telescopically out of said outer pipe member said predetermined snub distance to prevent further movement of said inner pipe member out of said outer pipe member.

2. The construction defined in claim 1 in which the stop means includes a disk engaged by the enlarged head at the free end of the snub member provided with a doughnutlike rubber cushion engageable with the second limit means.

3. The construction defined in claim 1 in which the flexible metal snub member is a metal rope cable.

4. The construction defined in claim 1 in which the flexible metal snub member is a metal chain.

* * * * *